United States Patent
Hidaka

(10) Patent No.: US 10,742,547 B2
(45) Date of Patent: Aug. 11, 2020

(54) COMMUNICATION DEVICE, TERMINAL DEVICE, CENTRAL SERVER DEVICE, INFORMATION PROCESSING SYSTEM, TELEGRAM PROCESSING METHOD AND TELEGRAM GENERATION METHOD

(71) Applicant: NEC CORPORATION, Tokyo (JP)

(72) Inventor: Youichi Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 15/544,907

(22) PCT Filed: Feb. 24, 2016

(86) PCT No.: PCT/JP2016/055434
§ 371 (c)(1),
(2) Date: Jul. 20, 2017

(87) PCT Pub. No.: WO2016/136813
PCT Pub. Date: Sep. 1, 2016

(65) Prior Publication Data
US 2017/0359257 A1    Dec. 14, 2017

(30) Foreign Application Priority Data
Feb. 27, 2015    (JP) .................................. 2015-037654

(51) Int. Cl.
*H04N 9/80*    (2006.01)
*H04L 12/741*    (2013.01)
(Continued)

(52) U.S. Cl.
CPC .............. *H04L 45/74* (2013.01); *G06F 13/00* (2013.01); *H04L 45/306* (2013.01); *H04L 69/22* (2013.01); *H04L 47/2483* (2013.01); *H04L 47/32* (2013.01)

(58) Field of Classification Search
CPC ........................................................ H04L 65/60
See application file for complete search history.

(56) References Cited

U.S. PATENT DOCUMENTS

2007/0053370 A1*  3/2007  Aghvami ................. H04W 8/18
                                                      370/401
2008/0069032 A1*  3/2008  Liu ......................... H04W 24/06
                                                      370/328
(Continued)

FOREIGN PATENT DOCUMENTS

JP          9204376 A       8/1997
JP          10-098493 A     4/1998
(Continued)

OTHER PUBLICATIONS

International Search Report for PCT/JP2016/055434 dated Mar. 29, 2016 [PCT/ISA/210].
(Continued)

*Primary Examiner* — Brandon M Renner
(74) *Attorney, Agent, or Firm* — Sughrue Mion, PLLC

(57) ABSTRACT

A communication device includes a forwarding processing unit configured to sort a telegram on the basis of processing content identification information included in header information of the telegram and a telegram processing unit configured to perform processing based on the processing content identification information on a payload of the telegram when the processing content identification information indicates processing in the communication device. The telegram processing unit can directly extract the payload of the telegram without performing protocol processing on the telegram and perform processing using the payload.

13 Claims, 6 Drawing Sheets

(51) Int. Cl.
*G06F 13/00* (2006.01)
*H04L 12/725* (2013.01)
*H04L 29/06* (2006.01)
H04L 12/851 (2013.01)
H04L 12/823 (2013.01)

(56) References Cited

U.S. PATENT DOCUMENTS

| | | | | |
|---|---|---|---|---|
| 2014/0201332 | A1* | 7/2014 | Kataoka | H04L 67/1008 709/219 |
| 2014/0204740 | A1* | 7/2014 | Tokutsu | H04L 47/2441 370/230 |
| 2015/0117253 | A1* | 4/2015 | Scott | H04L 45/306 370/254 |
| 2015/0142919 | A1* | 5/2015 | Lee | H04L 67/2814 709/219 |
| 2017/0148483 | A1* | 5/2017 | Takahashi | G11B 20/1217 |

FOREIGN PATENT DOCUMENTS

| | | |
|---|---|---|
| JP | 10173709 A | 6/1998 |
| JP | 2003-289338 A | 10/2003 |
| JP | 2006-157601 A | 6/2006 |
| JP | 2009-231903 A | 10/2009 |
| JP | 2012-80452 A | 4/2012 |
| JP | 2014-137709 A | 7/2014 |
| WO | 2011/099320 A1 | 8/2011 |

OTHER PUBLICATIONS

Written Opinion for PCT/JP2016/055434 dated Mar. 29, 2016 [PCT/ISA/237].
Communication dated Jan. 8, 2019, from Japanese Patent Office in counterpart application No. 2015-037654.
Communication dated Oct. 23, 2018, from Japanese Patent Office in counterpart application No. 2015-037654.

* cited by examiner

FIG. 5

| PROCESSING CONTENT IDENTIFICATION INFORMATION | DATA PROCESSING CONTENT |
|---|---|
| A: VIDEO ANALYSIS | AFTER VIDEO ANALYSIS, CONVERSION INTO ANALYSIS RESULT |
| B: VIDEO COMPRESSION | VIDEO COMPRESSION |
| C: SOUND ANALYSIS | AFTER SOUND ANALYSIS, CONVERSION INTO ANALYSIS RESULT |
| ... | ... |
| D: FAILURE DATA | DISCARD |
| ... | ... |
| N: NO PROCESSING | NO PROCESSING |

US 10,742,547 B2

COMMUNICATION DEVICE, TERMINAL DEVICE, CENTRAL SERVER DEVICE, INFORMATION PROCESSING SYSTEM, TELEGRAM PROCESSING METHOD AND TELEGRAM GENERATION METHOD

CROSS REFERENCE TO RELATED APPLICATIONS

This application is a National Stage of International Application No. PCT/JP2016/055434 filed Feb. 24, 2016, claiming priority based on Japanese Patent Application No. 2015-037654 filed Feb. 27, 2015, the contents of all of which are incorporated herein by reference in their entirety.

TECHNICAL FIELD

The present invention relates to a communication device, a terminal device, a central server device, an information processing system, a telegram processing method, and a telegram generation method.

BACKGROUND ART

With the spread of the Internet of things (IoT), various devices such as sensors are being connected to a network and data is transmitted and received by the devices. Also, data transmitted and received from these devices is required to be processed in real time in many cases.

However, in many cases, a device and a server device for processing data transmitted from the device are physically separated from each other, and real-time processing may be difficult in consideration of a transmission time of a network. Also, the number of devices connected to the network may be enormous, and the amount of data transmitted from these devices is vast. Due to the vast amount of data, the narrowing of a network bandwidth or a processing delay due to processing of the vast amount of data is problematic.

To solve such a problem, a system is provided with a relay device between various devices provided at the end of the network and a server device and which causes a part of processing to be performed in the server device to be imposed on the relay device. Thereby, it is possible to disperse the processing load of the server device and it is possible to reduce the processing delay problem. Also, by keeping communication of data transmitted from the device between the device and the relay device, it is possible to shorten the network transmission time and prevent the network bandwidth from being narrowed.

For example, Patent Document 1 discloses a system in which data of images captured by an image sensor is transmitted to a relay device in a local area network (LAN) instead of being transmitted to a server device via a network and the relay device performs processing on behalf of the server device. Also, according to this system, it is described that it is possible to reduce network traffic and load on the server device by keeping a transfer of image data within the LAN.

PRIOR ART DOCUMENT

Patent Document

Patent Document 1: PCT International Publication No. WO 2011/099320

DISCLOSURE OF INVENTION

Problems to be Solved by the Invention

However, in the above configuration, there is a problem that a processing delay occurs and a real-time property is lost when the processing load of the relay device becomes high.

Therefore, it is an objective of the present invention to provide a communication device, a terminal device, a central server device, an information processing system, a telegram processing method, and a telegram generation method for solving the above-mentioned problem.

Means for Solving the Problem

The present invention for solving the above-described objective provides a communication device including: a forwarding processing unit configured to sort a telegram on the basis of processing content identification information included in header information of the telegram; and a telegram processing unit configured to perform processing based on the processing content identification information on a payload of the telegram when the processing content identification information indicates processing in the communication device.

Also, the present invention provides a terminal device including: a header change unit configured to add the processing content identification information indicating the processing on the telegram in the above-described communication device to the header information of the telegram when the terminal device transmits the telegram to the communication device.

Also, the present invention provides a central server device configured to transmit the information including the processing content in the communication device for the telegram included in header information of the telegram transmitted from the above-described terminal device to the terminal device.

Also, the present invention provides an information processing system including: the above-described central server device; the above-described communication device; and the above-described terminal device, wherein the central server device transmits information including processing content in the communication device to the terminal device, wherein the terminal device adds the processing content identification information based on the information including the processing content in the communication device to the header information of the telegram including detected data and transmits the telegram to the communication device, and wherein the communication device extracts the payload of the telegram and performs the processing based on the processing content identification information on the extracted payload without transmitting the telegram to the central server device when the processing content identification information indicates a predetermined value.

Also, the present invention provides a telegram processing method including: sorting a telegram on the basis of processing content identification information included in header information of the telegram; transferring the telegram to another device when the processing content identification information indicates a transfer to the other device; and performing processing based on the processing content identification information on a payload of the telegram when the processing content identification information indicates processing in own device.

Also, the present invention provides a telegram generation method in an information processing system including a central server device, a terminal device and a communication device located between the central server device and the terminal device and configured to relay communication from the terminal device to the central server device, the telegram generation method including: adding processing content identification information indicating processing of a telegram in the communication device to header information of the telegram transmitted by the terminal device.

Effects of the Invention

According to the present invention, processing on a payload can be performed without performing the processing of an operating system (OS) or the processing of a network protocol, so that there is an effect that the processing overhead can be reduced and high-speed processing can be performed.

BRIEF DESCRIPTION OF DRAWINGS

FIG. 5 is an example of a configuration of a packet transfer table according to the first embodiment.

EMBODIMENTS FOR CARRYING OUT THE INVENTION

First Embodiment

Hereinafter, an edge gateway device (hereinafter, an edge GW device) according to the first embodiment of the present invention will be described with reference to FIGS. 1 to 6.

Figure 1:
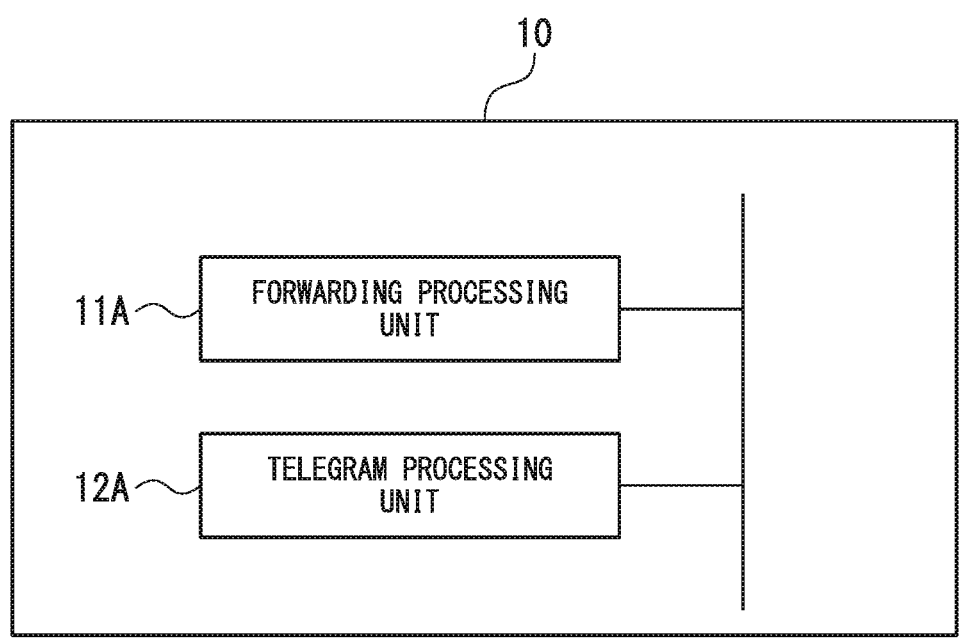
FIG. 1 is a diagram showing a minimum configuration of an edge GW device according to a first embodiment of the present invention.

FIG. 1 is a diagram showing a minimum configuration of the edge GW device according to the first embodiment of the present invention.

In FIG. 1, reference numeral 10 represents an edge GW. As shown in FIG. 1, the edge GW device 10 includes at least a forwarding processing unit 11A and a telegram processing unit 12A.

The forwarding processing unit 11A sorts a telegram on the basis of processing content identification information included in header information of the telegram.

When the processing content identification information indicates processing in the edge GW device, the telegram processing unit 12A performs processing based on processing content identification information on a payload of the telegram.

Figure 2:
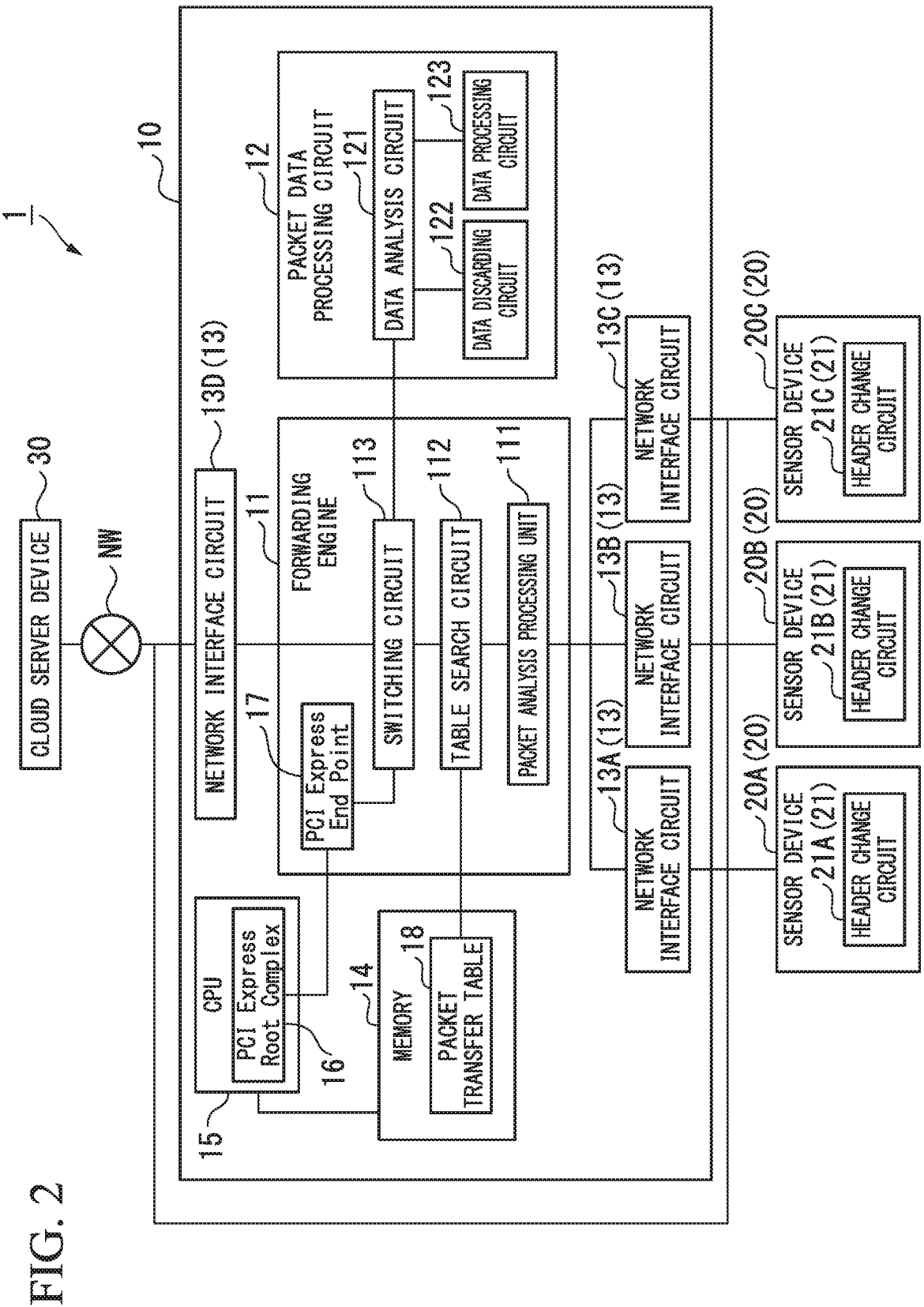
FIG. 2 is a diagram showing an example of an information processing system including a specific configuration of the edge GW device according to the first embodiment.

FIG. 2 is a diagram showing an example of an information processing system including a specific configuration of the edge GW device according to the first embodiment.

As shown in FIG. 2, the information processing system 1 includes an edge GW device 10, a plurality of sensor devices 20 (20A, 20B, and 20C), and a cloud server device 30. The edge GW device 10 is connected to the cloud server device 30 via a network NW.

The edge GW device 10 is connected to the plurality of sensor devices 20A to 20C. Also, the cloud server device 30 is connected to the plurality of sensor devices 20A to 20C via the network NW.

In the information processing system 1 including the cloud server device 30 and the sensor device 20, the edge GW device 10 is connected onto a path of the communication network NW located between the cloud server device 30 and the sensor device 20, and is a relay device that relays communication from the sensor device 20 to the cloud server device 30.

The edge GW device 10 includes a forwarding engine 11, a packet data processing circuit 12, network interface circuits 13 (13A, 13B, 13C, and 13D), a memory 14, a central processing unit (CPU) 15, a PCI express root complex 16, a PCI express end point 17, and a packet transfer table 18.

The forwarding engine 11, the packet data processing circuit 12, and the network interface circuit 13 are configured as an integrated circuit such as an application specific integrated circuit (ASIC) or a field-programmable gate array (FPGA).

The forwarding engine 11 corresponds to the forwarding processing unit 11A in FIG. 1 and includes a packet analysis processing unit 111, a table search circuit 112, and a switching circuit 113.

The packet analysis processing unit 111 acquires and analyzes packets received by the network interface circuits 13A to 13C. By analyzing each of the packets, the packet analysis processing unit 111 acquires processing content identification information included in a header of the packet, and outputs the processing content identification information to the table search circuit 112.

The table search circuit 112 searches the packet transfer table 18 using the processing content identification information acquired from the packet analysis processing unit 111, and acquires information indicating processing content corresponding to the processing content identification information.

The switching circuit 113 sorts the packet on the basis of the information indicating the processing content acquired from the packet transfer table 18 by the table search circuit 112.

For example, when the information indicating the processing content indicates "no processing," the switching circuit 113 transmits the packet to the cloud server device 30 via the network interface circuit 13D. When the information indicating the processing content is other than "no processing," the switching circuit 113 outputs the information indicating the processing content to the packet data processing circuit 12.

The packet data processing circuit 12 corresponds to the telegram processing unit 12A in FIG. 1. The packet data processing circuit 12 includes a data analysis circuit 121, a data discarding circuit 122, and a data processing circuit 123.

The data analysis circuit 121 acquires the information indicating the processing content output by the switching circuit 113 and instructs the data discarding circuit 122 or the data processing circuit 123 to perform processing according to the information indicating the processing content. Particularly, when the data processing circuit 123 is instructed to perform the processing, the data analysis circuit 121 extracts data of the payload of the packet and instructs the data processing circuit 123 to perform data processing on the extracted data.

The data discarding circuit 122 discards the packet when the information indicating the processing content is "discard."

The data processing circuit 123 performs data processing on the basis of the information indicating the processing content.

The network interface circuit 13 transmits and receives a packet.

The network interface circuits 13A to 13C receive packets transmitted by the sensor devices 20A to 20C. Also, the network interface circuits 13A to 13C transmit the processing result of the data processing by the data processing circuit 123 to the sensor devices 20A to 20C.

The network interface circuit 13D transmits the packets received from the sensor devices 20A to 20C to the cloud server device 30.

The memory 14 includes a storage medium such as a random access memory (RAM) or a random only memory (ROM). The memory 14 stores various programs, a packet transfer table 18, and the like.

The CPU 15 reads a program for setting the operation of the forwarding engine 11 from the memory 14 and executes the read program.

The PCI express root complex 16 is provided in the CPU 15 and outputs operation setting information to the PCI express end point 17 provided in the forwarding engine 11 according to an instruction of the operation setting program of the forwarding engine 11 executed by the CPU 15.

The forwarding engine 11 acquires the operation setting information via the PCI express end point 17 and sets an operation of the forwarding function.

The packet transfer table 18 is a data table for storing processing content identification information and processing content corresponding thereto.

The sensor devices 20A to 20C are, for example, a temperature sensor, a vibration sensor, an image sensor (camera), an audio sensor (microphone), and the like. The sensor devices 20A to 20C transmit the detected data to the edge GW device 10.

The sensor device 20A includes a header change circuit 21A. The sensor device 20B includes a header change circuit 21B. The sensor device 20C includes a header change circuit 21C (the header change circuits 21A, 21B, and 21C are collectively referred to as a header change circuit 21).

The header change circuit 21 adds processing content identification information to the header information of the packet including the data detected by the corresponding sensor device (detected data). The processing content identification information is a flag indicating how the edge GW device 10 processes a packet including the detected data.

How the edge GW device 10 processes the detected data is determined by the cloud server device 30.

For example, when the detected data is image data and the image data is used for a service in which a real-time property is required, the real-time property may be lost due to a reason that the transmission of the packet is time-consuming or the like if the image data is transmitted to the cloud server device 30. In such a case, the cloud server device 30 determines causing the edge GW device 10 to process the image data without transmitting the image data to the device itself. In that case, the cloud server device 30 transmits instruction information for issuing an instruction for adding processing content identification information indicating processing to be performed on the detected data in the edge GW device 10 to the sensor device 20. The header change circuit 21 adds the processing content identification information to the header information of the packet on the basis of the instruction information.

The cloud server device 30 performs processing on the detected data transferred via the edge GW device 10 among the detected data transmitted by the sensor devices 20A to 20C. The processing to be performed by the cloud server device 30 is, for example, processing in which the real-time property is not required.

Figure 3:
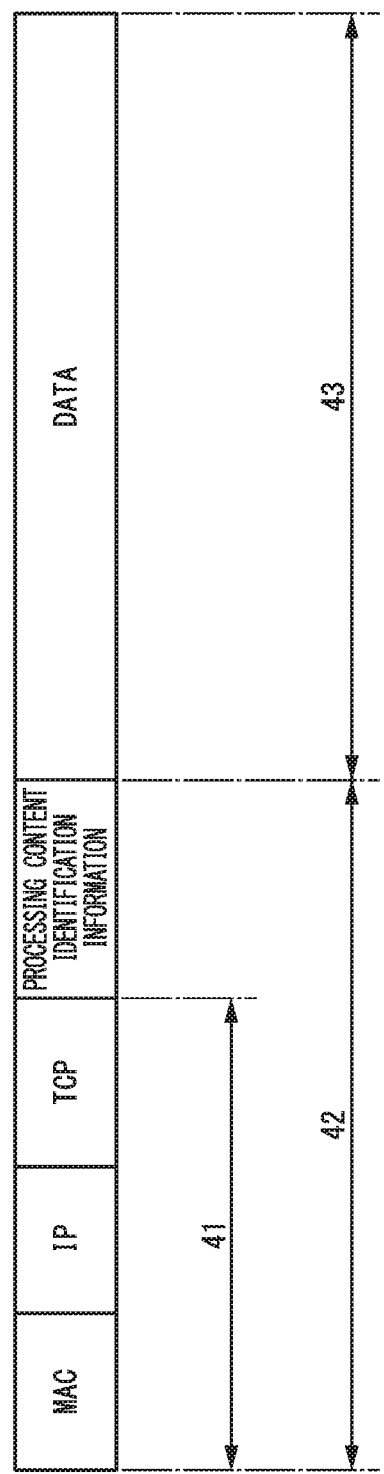
FIG. 3 is a diagram showing an example of transmitted data according to the first embodiment.

FIG. 3 is a diagram showing an example of transmitted data according to the first embodiment.

FIG. 3 is a schematic diagram showing a data configuration of a packet transmitted by the sensor device according to the present embodiment.

The header information 41 is header information in a general packet. In a general packet, the header information includes protocol information of a data link layer such as a MAC address, information on a protocol of a network layer such as IP, and information on a protocol of a transport layer such as TCP.

On the other hand, the header information 42 is header information in the packet of this embodiment. As shown in FIG. 3, the header information 42 includes processing content identification information in addition to general header information.

The payload 43 includes detected data by the sensor devices 20A to 20C.

Figure 4A:
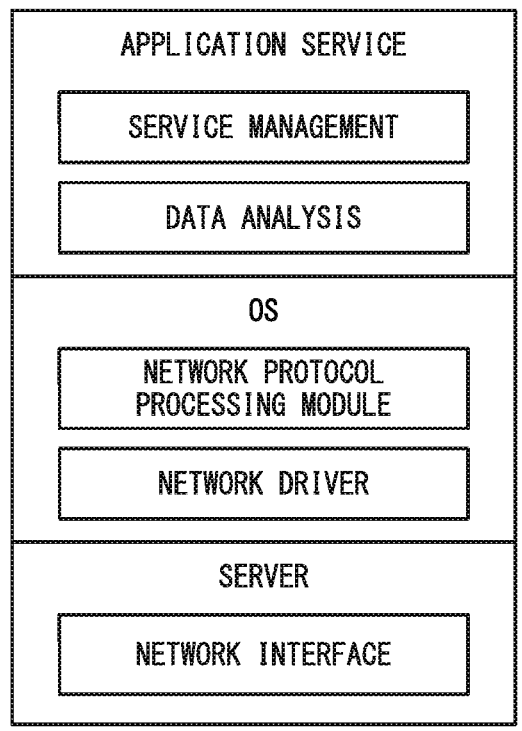
FIG. 4A is a diagram showing data processing according to the first embodiment and is a schematic diagram of a configuration of a general relay device.
Figure 4B:
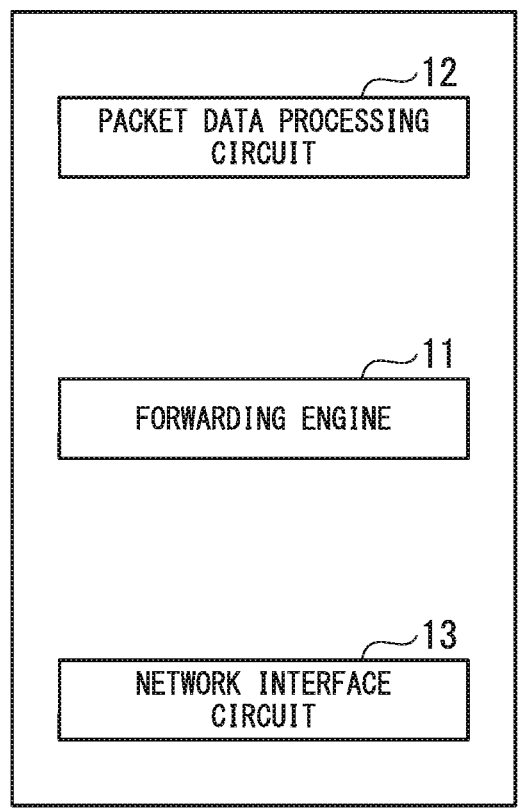
FIG. 4B is a diagram showing data processing according to the first embodiment and is a schematic diagram of a configuration of a relay device according to the present embodiment.

FIGS. 4A to 4B are diagrams showing data processing according to the first embodiment.

FIG. 4A is a schematic diagram of a configuration of a general relay device. In a general relay device, for example, an information processing device such as a PC server is used in many cases.

In a general server device, a network interface receives a packet transmitted by a sensor device, and the OS processes the received packet.

For example, the network driver included in the OS buffers a packet received by the network interface in a memory.

Also, the OS identifies a network protocol to be used for communication with reference to the header information of each packet and causes a protocol processing module according to the network protocol to execute protocol processing of each packet. Also, the OS assembles packets subjected to the protocol processing, and generates data capable of being used by application software during an application service. The application software analyzes the data generated by the OS and executes processing according to the data.

As described above, in the case of a relay device using a general server device or the like, various processes are required before the application software executes processing and the processing overhead increases. Also, the operation of the network driver or protocol processing in the OS gives a heavy load to the CPU.

Particularly, in the TOT, because a large number of sensor devices are connected to the relay device and a large amount of data is transmitted, it is necessary to repeat the above-described processing every time a packet is received and a large load is applied to the CPU of the relay device. Thereby, a processing delay may also occur in processing in which a real-time property is required.

FIG. 4B is a schematic diagram of the configuration of the relay device in the present embodiment.

The edge GW device 10 (relay device) in the present embodiment has a configuration closer to a network device such as a router, a switch, and a network processor than an information processing device such as a server device.

The edge GW device 10 includes a network interface circuit 13, a forwarding engine 11, and a packet data processing circuit 12.

The forwarding engine 11 refers to the processing content identification information stored in header information of a packet received by the network interface circuit 13 and determines whether or not the packet is a packet containing data for which data processing by the application is required. At this time, it is only necessary for the forwarding engine 11 to access a predetermined data position of the header information and directly refer to processing content identification information, and it is unnecessary to execute processing by a network driver or protocol processing as in the case of a general server device. When the forwarding engine 11 determines that the packet includes data for which data processing is required, the forwarding engine 11 outputs information including processing content thereof to the packet data processing circuit 12.

The packet data processing circuit 12 performs processing according to the information including the acquired processing content. Also, in this case, the packet data processing circuit 12 directly accesses the payload of the packet and extracts data of the payload without executing processing of a network driver, protocol processing or the like. The packet data processing circuit 12 performs necessary data processing using the extracted data.

As described above, according to the edge GW device 10 of the present embodiment, when data processing by an application after the reception of a packet is performed as in data processing in a general server device, it is unnecessary to perform processing with awareness of the network protocol of various layers loaded on a packet or processing of the device driver or OS associated therewith and it is possible to reduce a processing overhead.

FIG. 5 is an example of the configuration of the packet transfer table 18 according to the first embodiment. In the packet transfer table 18, processing content identification information and data processing content are recorded in association with each other.

For example, the record in the first row of the packet transfer table 18 indicates that video analysis is performed on the detected data (video data) included in the packet and the data is converted into an analysis result when a value of the processing content identification information of the header information of the packet is "A,".

Also, when the value of the content identification information is "D," this indicates that the packet contains failure data and is a packet to be discarded.

When the value of the processing content identification information is "N," this indicates that the packet is to be transmitted to the cloud server device 30 without being processed.

On the basis of the packet transfer table 18, the forwarding engine 11 determines whether to transfer the packet acquired from the sensor device 20 to the cloud server device 30 or to perform data processing without performing the transfer.

When the data processing is performed, the packet data processing circuit 12 performs data processing on the detected data included in the packet on the basis of the packet transfer table 18.

Figure 6:
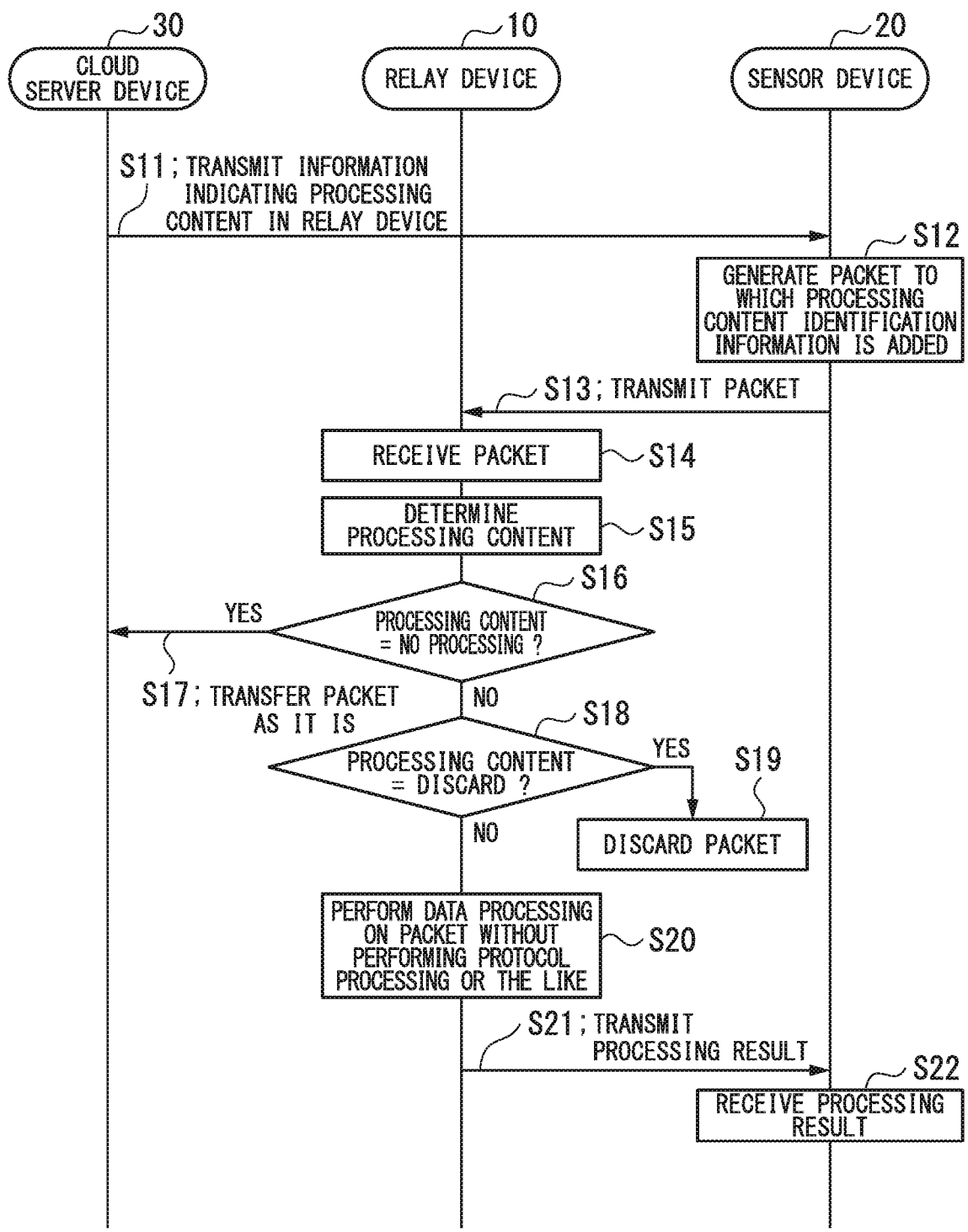
FIG. 6 is a flowchart of information processing by the information processing system of the first embodiment.

FIG. 6 is a flowchart of information processing by the information processing system of the first embodiment.

As an example, the sensor device 20 is assumed to be an image sensor (camera).

First, the cloud server device 30 transmits information indicating processing content in the edge GW device 10 to the sensor device 20 (step S11). The information indicating the processing content may be, for example, a value of the processing content identification information of the packet transfer table 18 shown in FIG. 5.

The sensor device 20 receives the indication information, and the header change circuit 21 stores the received indication information. Then, the sensor device 20 transmits captured image data to the edge GW device 10 at, for example, predetermined time intervals. At that time, the header change circuit 21 generates a packet in which the above-described processing content identification information is added to the header information (step S12). The sensor device 20 transmits the generated packet to the edge GW device 10 (step S13).

In the edge GW device 10, the network interface circuit 13 receives the packet to which the processing content identification information has been added (step S14). Then, the network interface circuit 13 outputs the received packet to the forwarding engine 11.

In the forwarding engine 11, the packet analysis processing unit 111 extracts the processing content identification information from the packet and outputs the processing content identification information to the table search circuit 112. As described above, because the packet analysis processing unit 111 directly accesses the processing content identification information, the processing cost required for a conventional device is not required.

The table search circuit 112 searches the packet transfer table 18 and acquires information (processing instruction information) indicating data processing content corresponding to the extracted processing content identification information.

The switching circuit 113 determines the processing content on the basis of the acquired processing instruction information (step S15). For example, the switching circuit 113 determines whether or not the processing instruction information (processing content) is "no processing" (step S16). When it is determined that the processing instruction information is "no processing" (step S16=Yes), the switching circuit 113 transfers the packet to a transmission destination indicated by an IP address of the header information of the packet as it is (step S17).

On the other hand, when it is determined that the processing instruction information is not "no processing" (step S16=No), the switching circuit 113 outputs the processing instruction information to the packet data processing circuit 12. In the packet data processing circuit 12, the data analysis circuit 121 acquires the processing instruction information output from the switching circuit 113.

Next, the data analysis circuit 121 determines whether or not the processing instruction information is "discard" (step S18). When it is determined that the processing instruction information is "discard" (step S18=Yes), the data analysis circuit 121 instructs the data discarding circuit 122 to discard the packet. The data discarding circuit 122 acquires the packet from the forwarding engine 11 and discards the packet (step S19).

On the other hand, if it is determined that the processing instruction information is not "discard" (step S18=No), the data analysis circuit 121 performs data processing on the packet without performing protocol processing or the like (step S20). That is, the data analysis circuit 121 acquires a packet from the forwarding engine 11, directly accesses payload data, and extracts the payload data. The data analysis circuit 121 outputs the extracted payload data and processing instruction information to the data processing circuit 123.

The data processing circuit 123 executes processing indicated by the processing instruction information (for example, video analysis, etc.) on the acquired payload data. The data processing circuit 123 transmits a processing result to the sensor device 20 via the network interface circuit 13 (step S21). The sensor device 20 receives the processing result (step S22).

According to the present embodiment, it is possible to immediately determine the processing for a packet on the basis of the processing content identification information included in the header information of the packet, so that the processing overhead in the edge GW device 10 can be reduced.

Also, if a result of the determination indicates that data processing on the payload included in the packet is necessary, it is possible to acquire payload data without performing protocol processing or OS processing, so that it is possible to reduce the overhead of data processing and speed up data processing or reduce the processing load.

Also, because the edge GW device 10 can execute data processing to be performed by the cloud server device 30 on behalf of the cloud server device 30, it is possible to reduce an amount of data to be transmitted to the cloud server device 30 and to reduce the bandwidth of the network used.

Also, according to the present embodiment, by including instruction information on network control such as packet transfer and discard and instruction information on data processing related to a service such as video analysis in the processing content identification information, it is possible to switch the edge GW device 10 and cause the edge GW device 10 to execute network control or service processing.

When the sensor device 20 divides video data or the like and transmits the divided video data to the edge GW device 10 for a reason such as a large data size of captured video data, the header change circuit 21 divides data to be transmitted (video data or the like). In this case, the header change circuit 21 adds the same processing content identification information and information to be used by the edge GW device 10 for constructing data on the basis of the divided data to the header information of the pieces of divided data. The information to be used to construct the data may be, for example, sequential numbers 1, 2, 3, etc. in order of constructing the data before division.

The sensor device 20 generates a plurality of packets including the divided data and transmits the packets to the edge GW device 10. If the edge GW device 10 received a plurality of packets including the divided data, the data analysis circuit 121 assembles payloads included in the plurality of packets to construct data by using information to be used for constructing data added together with processing content identification information. Also, the data processing circuit 123 performs data processing on the constructed data.

Also, it is possible to appropriately replace constituent elements in the above-described embodiment with well-known constituent elements without departing from the scope of the present invention. For example, the above-described video data may be audio data or image data of a still image.

Also, the technical scope of the present invention is not limited to the above-described embodiments, and various modifications can be made without departing from the scope of the present invention.

The edge GW device 1 is an example of a communication device. The sensor device 20 is an example of a terminal device. The cloud server device 30 is an example of a central server device. The header change circuit 21 is an example of a header change unit.

This application claims priority to Japanese Patent Application No. 2015-037654 filed on Feb. 27, 2015, the entire disclosure of which is incorporated herein by reference.

INDUSTRIAL APPLICABILITY

According to the present invention, it is possible to perform processing on a payload without performing processing of an OS and processing of a network protocol, so that the processing overhead can be reduced and high-speed processing is enabled.

REFERENCE SYMBOLS

1 Information processing system
10 Edge GW device
11 Forwarding engine
111 Packet analysis processing unit
112 Table search circuit
113 Switching circuit
12 Packet data processing circuit
121 Data analysis circuit
122 Data discarding circuit
123 Data processing circuit
13, 13A, 13B, 13C, 13D Network interface circuit
14 Memory
15 CPU
16 PCI express root complex
17 PCI express end point
18 Packet transfer table
20, 20A, 20B, 20C Sensor device
21, 21A, 21B, 21C Header change circuit
30 Cloud server device

The invention claimed is:

1. A communication device that is connected onto a path of a communication network located between a central server device and a plurality of terminal devices in an information processing system including the central server device and the plurality of terminal devices, and relays communication from the plurality of terminal devices to the central server device, the communication device comprising:

a network interface circuit configured to receive, from each of the plurality of terminal devices, a telegram including processing content identification information that is determined by the central server device and indicates a transfer of the telegram to the central server device or content of data processing to be performed in the communication device without the transfer, the central server device being connected to a plurality of communication devices and performing data processing of a plurality of telegrams transferred from the plurality of terminal devices, a forwarding processing circuit configured to sort the telegram on the basis of the processing content identification information, which is determined by the central server device and included in header information of the telegram, and transfer the telegram via another device as a relay destination to the central server device when the processing content identification information indicates the transfer to the central server device; and a telegram processing circuit configured to perform the data processing based on the processing content identification information on a payload of the telegram in the communication device instead of the central server device without the transfer of the telegram to the central server device when the processing content identification information indicates the content of the data processing in the communication device.

2. The communication device according to claim 1, wherein the telegram processing circuit directly extracts a payload of the telegram without performing protocol processing on the telegram, and performs the data processing using the payload.

3. The communication device according to claim 1, wherein the telegram processing circuit performs the data processing on the basis of the processing content identification information and transmits a result of the data processing to at least one of the plurality of terminal devices.

4. The communication device according to claim 1, wherein the forwarding processing circuit transfers the telegram to the central server device as the another device on the basis of the processing content identification information.

5. The communication device according to claim 1, wherein the telegram processing circuit performs a process of discarding the telegram on the basis of the processing content identification information.

6. A terminal device comprising:
a header change circuit configured to add processing content identification information, which is determined by a central server device and indicates a transfer of a telegram to the central server device or the content of data processing to be performed on the telegram in a communication device without the transfer, to header information of the telegram when the terminal device transmits the telegram to the communication device, the communication device being connected onto a path of a communication network located between the central server device and a plurality of terminal devices in an information processing system including the central server device and the plurality of terminal devices and relaying communication from the plurality of terminal devices to the central server device, the central server being connected to a plurality of communication devices and performing the data processing of a plurality of telegrams transferred from the plurality of terminal devices, the communication device comprising:
a network interface circuit configured to receive, from each of the plurality of terminal devices, the telegram including the processing content identification information determined by the central server device;
a forwarding processing circuit configured to sort the telegram on the basis of the processing content identification information determined by the central server device included in the header information of the telegram and transfer the telegram via another device as a relay destination to the central server device when the processing content identification information indicates the transfer to the central server device; and
a telegram processing circuit configured to perform the data processing based on the processing content identification information on a payload of the telegram in the communication device instead of the central server device without the transfer of the telegram to the central server device when the processing content identification information indicates the content of the data processing in the communication device.

7. The terminal device according to claim 6, wherein the terminal device is connected to the central server device as the another device, and
wherein the header change circuit adds the processing content identification information to the header information on the basis of information including the content of the data processing in the communication device acquired from the central server device.

8. The terminal device according to claim 7,
wherein the terminal device is a sensor device, and
wherein the sensor device transmits the telegram including data detected by own device to the communication device.

9. A central server device that is connected to a plurality of communication devices and performs data processing of a plurality of telegrams transferred from a plurality of terminal devices, the central server device comprising:
a processor configured to:
determine processing content identification information which indicates a transfer of a telegram to the central server device or content of data processing to be performed on the telegram in one of the plurality of communication devices without the transfer,
transmit information, to a terminal device, including the procession content identification information included in header information of the telegram that is transmitted from the terminal device to the communication device,
wherein the terminal device comprises
a header change circuit configured to add the processing content identification information determined by the central server device, to the header information of the telegram when the terminal device transmits the telegram to the communication device, the communication device being connected onto a path of a communication network located between the central server device and the plurality of terminal devices in an information processing system including the central server device and the plurality of terminal devices and relaying communication from the plurality of terminal devices to the central server device, and
wherein the communication device comprises:
a network interface circuit configured to receive, from each of the plurality of terminal devices, the telegram including the processing content identification information determined by the central server device;
a forwarding processing circuit configured to sort the telegram on the basis of the processing content identification information which is determined by the central server device and included in the header information of the telegram, and transfer the telegram via another device as a relay destination to the central server device when the processing content identification information indicates the transfer to the central server device; and
a telegram processing circuit configured to perform the data processing based on the processing content identification information on a payload of the telegram in the communication device instead of the central server device without the transfer of the telegram to the central server device when the processing content identification information indicates the content of the data processing in the communication device.

10. An information processing system comprising:
a central server device configured to determine processing content identification information, which indicates a transfer of a telegram to the central server device or content of data processing to be performed on the telegram in a communication device without the transfer, and transmit information, to a terminal device, including the processing content identification information included in header information of the telegram that is transmitted from the terminal device to the communication device, the central server device being connected to a plurality of communication devices and performing data processing of a plurality of telegrams transferred front a plurality of terminal devices, wherein the communication device is connected onto a path of a communication network located between the central server device and the plurality of terminal devices, and relays communication from the plurality of terminal devices to the central server device, and includes:

a network interface circuit configured to receive, from each of the plurality of terminal devices, the telegram including the processing content identification information determined by the central server device;

a forwarding processing circuit configured to sort the telegram on the basis of the processing content identification information which is determined by the central server device and included in header information of the telegram, and transfer the telegram via another device as a relay destination to the central server device when the processing content identification information indicates the transfer to the central server device, and a telegram processing circuit configured to perform the data processing based on the processing content identification information on a payload of the telegram in the communication device instead of the central server device without the transfer of the telegram to the central server device when the processing content identification information indicates the content of the data processing in the communication device; and the terminal device includes:

a header change circuit configured to add the processing content identification information to the header information of the telegram when the terminal device transmits the telegram to the communication device, wherein the central server device determines the processing content identification information and transmits the information including the processing content identification information to the terminal device, wherein the terminal device adds the processing content identification information to the header information of the telegram including detected data and transmits the telegram to the communication device, and wherein the communication device extracts a payload of the telegram and performs the data processing based on the processing content identification information determined by the central server device on the extracted payload without the transfer of the telegram to the central server device when the processing content identification information indicates a predetermined value.

11. The information processing system according to claim 10, wherein the terminal device divides data to be transmitted and adds the same processing content identification information and construction information to be used for constructing data on the basis of the divided data to the pieces of divided data, and wherein the telegram processing circuit of the communication device constructs the divided data on the basis of the construction information and performs the data processing based on the processing content identification information.

12. A telegram processing method comprising:

receiving, by a communication device that is connected onto a path of a communication network located between a central server device and a plurality of terminal devices in an information processing system including the central server device and the plurality of terminal devices and relays communication from the plurality of terminal devices to the central server device, a telegram from each of the plurality of terminal devices, the telegram including processing content identification information that is determined by the central server device and indicates a transfer of the telegram to the central server device or content of data processing to be performed in the communication device without the transfer, the central server device being connected to a plurality of communication devices and performing data processing of a plurality of telegrams transferred from the plurality of terminal devices, sorting, by the communication device the telegram on the basis of the processing content identification information which is determined by the central server device and included in header information of the telegram;

transferring, by the communication device, the telegram via another device as a relay destination to the central server device when the processing content identification information indicates the transfer of the telegram to the central server device; and performing, by the communication device, the data processing based on the processing content identification information on a payload of the telegram in the communication device instead of the central server device without the transfer of the telegram to the central server device when the processing content identification information indicates the content of the data processing is to be performed without the transfer.

13. A telegram generation method, performed by a terminal device in an information processing system including a central server device and a plurality of terminal devices and a communication device that is connected onto a path of a communication network located between the central server device and the plurality of terminal devices, the telegram generation method comprising:

adding, by the terminal device, processing content identification information, which is determined by the central server device and indicates a transfer of a telegram via another device as a relay destination to the central server device or content of data processing to be performed on the telegram in the communication device instead of the central server device without the transfer of the telegram to the central server device, to header information of the telegram when the terminal device transmits the telegram to the communication device, the communication device sorting the telegram on the basis of the processing content identification information and transferring the telegram to the central server device when the processing content identification information indicates the transfer, and performing the data processing based on the processing content identification information in the communication device when the processing content identification information indicates the content of the data processing, the central server being connected to a plurality of communication devices and performing the data processing of a plurality of telegrams transferred from the plurality of terminal devices.

* * * * *

UNITED STATES PATENT AND TRADEMARK OFFICE
CERTIFICATE OF CORRECTION

PATENT NO. : 10,742,547 B2
APPLICATION NO. : 15/544907
DATED : August 11, 2020
INVENTOR(S) : Youichi Hidaka Page 1 of 1

It is certified that error appears in the above-identified patent and that said Letters Patent is hereby corrected as shown below:

In the Specification

Column 6, Embodiments for Carrying Out the Inventions, Line 57; Delete "TOT," and insert --IOT,-- therefor In the Claims Column 12, Line 22; In Claim 9, delete "procession" and insert --processing-- therefor Column 13, Line 5; In Claim 10, delete "front" and insert --from-- therefor Signed and Sealed this
First Day of December, 2020

Andrei Iancu
*Director of the United States Patent and Trademark Office*